United States Patent
Büscher

(10) Patent No.: US 11,155,342 B2
(45) Date of Patent: Oct. 26, 2021

(54) LEADING EDGE STRUCTURE FOR A FLOW CONTROL SYSTEM OF AN AIRCRAFT

(71) Applicant: Airbus Operations GmbH, Hamburg (DE)

(72) Inventor: Alexander Büscher, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 259 days.

(21) Appl. No.: 16/354,757

(22) Filed: Mar. 15, 2019

(65) Prior Publication Data

US 2019/0283866 A1    Sep. 19, 2019

(30) Foreign Application Priority Data

Mar. 15, 2018  (DE) .................. 10 2018 106 064.5

(51) Int. Cl.
*B64C 21/04* (2006.01)
*B64C 5/02* (2006.01)
(Continued)

(52) U.S. Cl.
CPC ............. *B64C 21/04* (2013.01); *B64C 3/28* (2013.01); *B64C 5/02* (2013.01); *B64C 5/06* (2013.01);
(Continued)

(58) Field of Classification Search
CPC ....... B64C 21/02; B64C 21/025; B64C 21/04; B64C 21/06; B64C 21/08; B64C 2230/06;
(Continued)

(56) References Cited

U.S. PATENT DOCUMENTS 5,934,611 A * 8/1999 Tindell .................... B64C 21/08
244/53 B
2010/0181435 A1* 7/2010 Sakurai ................... B64C 21/02
244/209
(Continued)

FOREIGN PATENT DOCUMENTS

EP    2 208 669    7/2010
EP    2 886 453    6/2015

OTHER PUBLICATIONS

European Search Report cited in EP 19162104.4 dated Jul. 15, 2019, 8 pages.
(Continued)

*Primary Examiner* — Richard R. Green
*Assistant Examiner* — William L Gmoser
(74) *Attorney, Agent, or Firm* — Nixon & Vanderhye P.C.

(57) ABSTRACT

A leading edge structure (11) for a flow control system of an aircraft (1) including a leading edge panel (13) surrounding surrounds a plenum (17) which extends in a span direction (19), wherein the leading edge panel (13) has a first side portion (21) extending from a leading edge point (23) to a first attachment end (25), wherein the leading edge panel (13) has a second side portion (27) opposite the first side portion (21), extending from the leading edge point (23) to a second attachment end (29), wherein the leading edge panel (13) comprises an inner surface (33) facing the plenum (17) and an outer surface (37) in contact with an ambient flow (39), and wherein the leading edge panel (13) comprises a plurality of micro pores (45) forming a fluid connection between the plenum (17) and the ambient flow (39).

18 Claims, 2 Drawing Sheets

(51) Int. Cl.
    *B64C 21/02*     (2006.01)
    *B64C 21/08*     (2006.01)
    *B64C 21/06*     (2006.01)
    *B64C 3/28*     (2006.01)
    *F15D 1/00*     (2006.01)
    *B64C 5/06*     (2006.01)
    *B64C 3/14*     (2006.01)

(52) U.S. Cl.
    CPC ............ *B64C 21/025* (2013.01); *B64C 21/06* (2013.01); *B64C 21/08* (2013.01); *B64C 2003/146* (2013.01); *B64C 2230/06* (2013.01); *B64C 2230/20* (2013.01); *B64C 2230/22* (2013.01); *F15D 1/008* (2013.01)

(58) Field of Classification Search
    CPC .. B64C 2230/20; B64C 2230/22; F15D 1/008
    See application file for complete search history.

(56) References Cited

U.S. PATENT DOCUMENTS

| 2014/0021304 A1* | 1/2014 | Gerber | B64C 3/26 244/35 R |
|---|---|---|---|
| 2015/0083866 A1 | 3/2015 | Biedscheid | |
| 2015/0360766 A1 | 12/2015 | Gerber | |

OTHER PUBLICATIONS

German Search Report of DE 10 2018 106 064.5 dated Nov. 15, 2018, 9 pages.

* cited by examiner

LEADING EDGE STRUCTURE FOR A FLOW CONTROL SYSTEM OF AN AIRCRAFT

RELATED APPLICATION

This application claims priority to German Patent Application DE 10 2018 106 064.5, filed Mar. 15, 2018, the entirety of which is incorporated by reference.

FIELD OF INVENTION

The present invention relates to a leading edge structure for a flow control system of an aircraft, in particular for a Hybrid Laminar Flow Control system, where air is sucked in and blown out of a porous surface of a flow body in order to extend the region of laminar flow along the flow body. Further aspects of the present invention relate to a vertical tail plane comprising such a leading edge structure, and an aircraft comprising such a leading edge structure or such a vertical tail plane. The leading edge structure may be part of a horizontal tail plane or of a wing for an aircraft.

BACKGROUND

The leading edge structure comprises a leading edge panel that surrounds a plenum in a curved, e.g., arcuate, manner. The plenum extends in a span direction through the leading edge structure.

When viewed in a cross section across the span direction, the leading edge panel has a first side portion extending from a leading edge point, i.e. from a fore tip of the leading edge structure, to a first attachment end on a first side of the leading edge structure. The leading edge point may extend as a line in a span-wise direction along the leading edge panel. The first attachment end being configured for attachment to a further structure located downstream from the leading edge. Further, the leading edge panel has a second side portion opposite the first side portion. The second side portion extends from the leading edge point to a second attachment end on a second side of the leading edge structure opposite the first side. The second attachment end being configured for attachment to a further structure downstream from the leading edge.

The leading edge panel comprises an inner surface facing the plenum and an outer surface in contact with an ambient flow. Further, the leading edge panel comprises a plurality of micro pores, such as perforations, forming a fluid connection between the plenum and the ambient flow moving over an outer surface, e.g., skin, of the leading edge panel. Air from the ambient flow can be sucked in through the micro pores into the plenum. Pressurized air from the plenum can be blown out through the micro pores into the ambient flow.

Such leading edge structures are known in the art of hybrid laminar flow control systems. For blowing out air from the plenum through the micro pores into the ambient flow the pressure in the plenum needs to be higher as the external pressure of the ambient flow acting on the outer surface of the leading edge panel. As the external pressure of the ambient flow has a maximum in the area of the leading edge point where the incoming ambient flow impinges on the outer surface of the leading edge panel in essentially perpendicular manner, the required plenum pressure for blowing out air is determined by the external pressure in the area of the leading edge point.

SUMMARY OF INVENTION

An invention has been made and is disclosed here that provides an efficient leading edge structure that is more precisely adapted to the requirements. In the invention, the plenum is separated by a partition wall into a leading edge plenum section in the area of the leading edge point, and a downstream plenum section downstream from the leading edge plenum section, i.e. further away from the leading edge point. The invention takes advantage of a lower pressure on the side portions of the leading edge structure which are downstream in the ambient flow from the area of the leading edge point. At these side portions the external pressure of the ambient air is significantly lower than at the leading edge point. Due to the reduced pressure at the side portions, the plenum pressure needed to blow out air in these side portions is significantly lower than the plenum pressure needed to blowout air at the leading edge point.

In an embodiment of the invention, the partition wall may extend in parallel to the span direction and is formed as a membrane e.g. of fiber reinforced plastic. Both plenum sections may be sealed from one another, so that the pressure in the leading edge plenum section does not affect the pressure in the downstream plenum section, e.g., in the side sections. In such a way, the plenum pressure applied in the leading edge plenum section may be greater than the plenum pressure in the downstream plenum section. This allows the plenum pressure in the downstream plenum section(s) to be adapted downstream along the first and second side portions of the leading edge panel as required to overcome the external pressure of the ambient flow. Specifically, in the downstream plenum section a lower pressure can be applied as in the leading edge plenum section, which in turn allows the downstream plenum section and the associated inlet and duct parts to be designed with minimum weight and space requirements and causes less aerodynamic drag at the inlet.

The partition wall may be arranged at between 10% and 50% or between 20% and 30% of the downstream length of the plenum, measured from the leading edge point in the downstream direction.

According to an embodiment, the leading edge plenum section is connected to a first air inlet via a first duct for letting in air from the ambient flow to the leading edge plenum section in order to blow out air through the corresponding micro pores in connection with the leading edge plenum section. The downstream plenum section may be connected to a second air inlet via a second duct for letting in air from the ambient flow to the downstream plenum section in order to blow out air through the corresponding micro pores in connection with the downstream plenum section. The first air inlet may be separate from the second air inlet and the first duct is separate from the second duct. In such a way, the first and second air inlets and the first and second ducts can be formed different from one another and can be adapted to the requirements of the respective one of the leading edge plenum section and the downstream plenum section.

In particular, the first air inlet and the first duct and/or the second air inlet and second duct may be configured, e.g., positioned and dimensioned, for letting in such a mass flow rate during flight of the associated aircraft that can cause a higher pressure in the leading edge plenum section as in the downstream plenum section, such as between 0% and 10% higher, between 1% and 7% higher, or between 2% and 5% higher. This means the air inlets and ducts are adapted to the respective requirements in order to increase efficiency of the leading edge structure.

The first air inlet and/or the second air inlet may be formed as a combined, hybrid air inlet/outlet device configured for both letting in air from the ambient flow and blowing out air into the ambient flow. This can be done e.g.

by the air inlet/outlet device including a first flap that may open to the inside to form a front-facing opening to let air in, and a second flap that may open to the outside to form a rear-facing opening to let air out. First and second flaps might be mounted to one another or share the same parts. With such a combined air inlet/outlet device both inlet and outlet function can be combined in one device so that no separate air inlet and air outlet are necessary, thereby reducing complexity, weight and space requirements of the leading edge structure. Further, no sealing of a flap that is not in operation has to be considered.

According to a further embodiment, the leading edge structure further comprises a back wall connecting the first attachment end to the second attachment end of the leading edge panel, thereby enclosing the plenum, specifically the downstream plenum section, on a side opposite the leading edge point. The back wall may be parallel to the partition wall and is formed as a membrane e.g. of fiber reinforced plastic.

According to an embodiment, the leading edge panel has a double-walled form including an inner wall element having the inner surface and, may be spaced apart from the inner wall element, an outer wall element having the outer surface. Such a double-walled form provides advantageous mechanical properties.

Between the inner and outer wall elements the leading edge panel may comprise a plurality of elongate stiffeners connecting the inner and outer wall elements and spaced apart from one another, so that between each pair of adjacent stiffeners a hollow chamber is formed between the inner and outer wall elements. The stiffeners may be formed integrally with the inner wall element, extend in the span direction, and have a solid and/or square-shaped or trapezoid-shaped cross section. Further, the inner wall element may be formed of a fiber reinforced plastic (FRP), the stiffeners are formed as sandwich structures, and the outer wall element is formed as a titanium or steel sheet. In such a way, a simple and reliable double-walled structure is provided.

The outer wall element may comprise the plurality of micro pores forming a fluid connection between the hollow chambers and the ambient flow. In particular, the outer wall element comprises multiple sections, wherein the porosity varies from one section to another section in terms of pore diameter and/or pore pitch. The inner wall element comprises openings forming a fluid connection between the hollow chambers and the plenum, in particular between the leading edge plenum section and the corresponding hollow chambers, and between the downstream plenum section and the corresponding hollow chambers. Each hollow chamber may comprise at least one opening. The openings may be formed as throttle holes having a predefined diameter adapted for a predefined mass flow rate through the throttle holes in order to achieve a predefined fluid pressure in the hollow chambers. Alternatively, the openings might be formed as simple holes having such a diameter that essentially the same pressure is present in the hollow chambers as in the plenum.

The invention may be embodied in a vertical tail plane for an aircraft. The vertical tail plane comprises a vertical tail plane box and a leading edge structure according to any of the embodiments described herein. The vertical tail plane box has a first lateral panel with a first attachment portion and an opposite second lateral panel with a second attachment portion. The first attachment end of the leading edge structure is attached to the first attachment portion and the second attachment end is attached to the second attachment portion, so that the first side portion of the leading edge panel forms a continuous flow surface with the first lateral panel of the vertical tail plane box and the second side portion of the leading edge panel forms a continuous flow surface with the second lateral panel of the vertical tail plane box. The features and advantageous described in connection with the leading edge structure apply vis-à-vis to the vertical tail plane.

According to an embodiment, the first air inlet and/or the second air inlet is arranged in the first lateral panel and/or in the second lateral panel and/or in another leading edge panel arranged beside the leading edge structure in the span direction. The first and second ducts may extend through the space between the vertical tail plane box and other the leading edge panel. The first air inlet and the second air inlet may be arranged on opposite sides of the vertical tail plane.

An aircraft comprising a leading edge structure according to any of the embodiments described herein, or comprising a vertical tail plane according to any of the embodiment described herein. The features and advantageous described in connection with the leading edge structure apply vis-à-vis to the vertical tail plane.

SUMMARY OF DRAWINGS

An embodiment of the present invention is described hereinafter in more detail by means of a drawing. The drawing shows in FIG. 1 is a perspective view of an aircraft.

DETAILED DESCRIPTION

Figure 1:
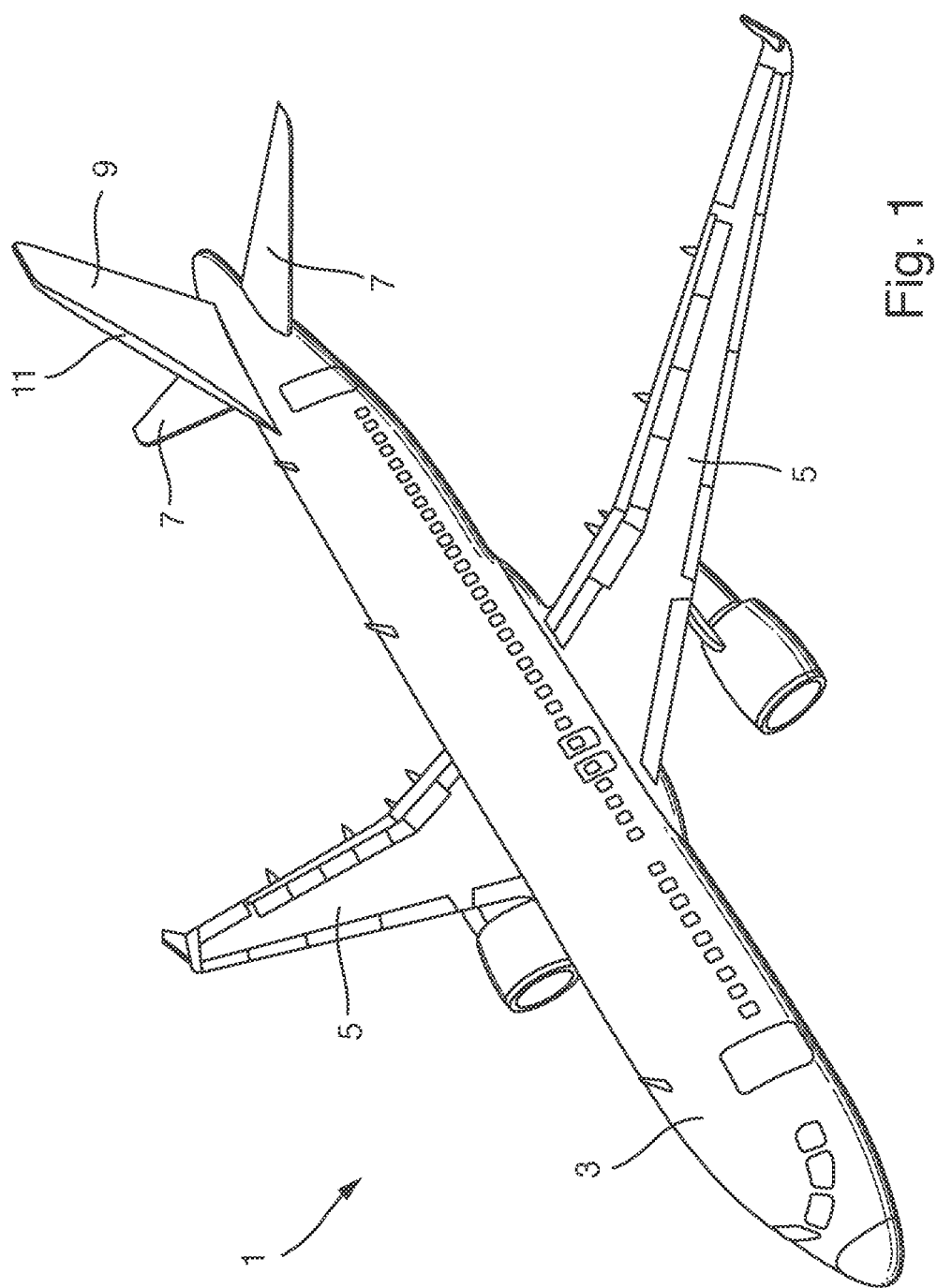

FIG. 1 shows an aircraft 1 including a fuselage 3, wings 5, a horizontal tail plane 7, and a vertical tail plane 9. The vertical tail plane 9 is shown in more detail in FIG. 2. The vertical tail plane 9 comprises a leading edge structure 11. The leading edge structure 11 is shown in more detail in FIG. 3.

The leading edge structure 11 is configured for a hybrid laminar flow control system and comprises a leading edge panel 13 and a back wall 15. The leading edge panel 13 surrounds a plenum 17 in a curved manner. The plenum 17 extends in a span direction 19 through the leading edge structure 11. When viewed in a cross section across the span direction 19, the leading edge panel 13 has a first side portion 21 extending from a leading edge point 23 to a first attachment end 25 on a first side of the leading edge structure 11. Further, the leading edge panel 13 has a second side portion 27 opposite the first side portion 21, wherein the second side portion 27 extends from the leading edge point 23 to a second attachment end 29 on a second side of the leading edge structure 11 opposite the first side. The back wall 15 connects the first attachment end 25 to the second attachment end 29 of the leading edge panel 13, thereby enclosing the plenum 17 on a side opposite the leading edge point 23.

The leading edge panel 13 has a double-walled form including an inner wall element 31 having an inner surface 33 facing the plenum 17, and an outer wall element 35 having an outer surface 37 in contact with an ambient flow 39. Between the inner and outer wall elements 31, 35 the leading edge panel 13 comprises a plurality of elongate stiffeners 41 extending in the span direction 19 and spaced apart from one another, so that between each pair of adjacent stiffeners 41 a hollow chamber 43 is formed between the inner and outer wall elements 31, 35. The stiffeners 41 are formed integrally with the inner wall element 31 in a sandwich form and have a solid, trapezoid-shaped cross section. The inner wall element 31 is formed of a fiber reinforced plastic (FRP). The outer wall element 35 is formed as a titanium sheet and comprises a plurality of micro pores 45 forming a fluid connection between the hollow chambers 43 and the ambient flow 39. The inner wall element 31 comprises openings 47 forming a fluid connection between the hollow chambers 43 and the plenum 17.

Figure 3:
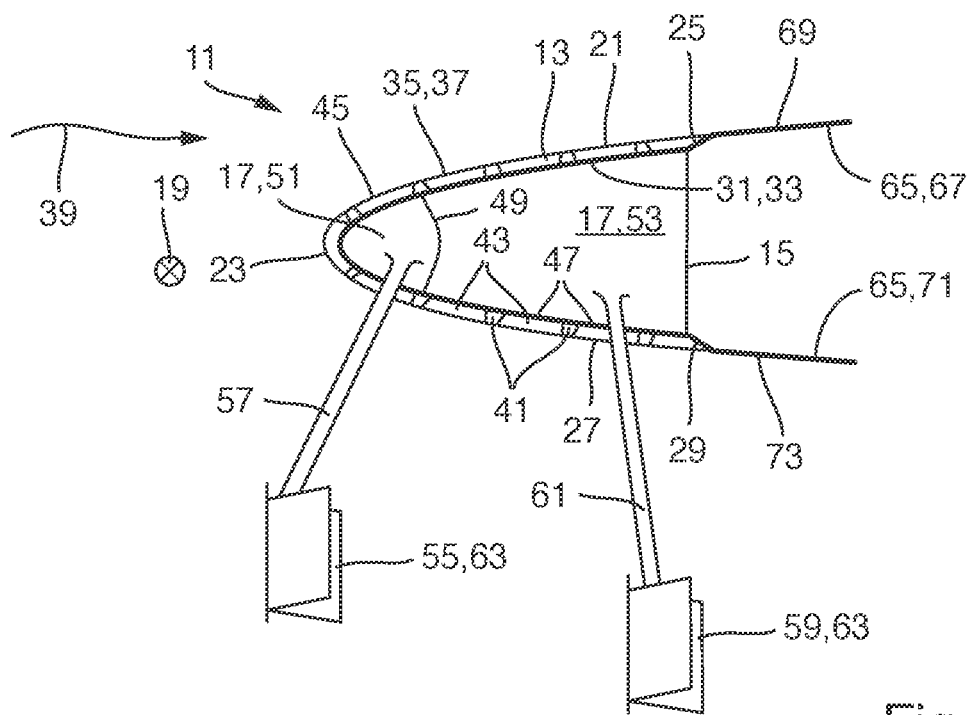
FIG. 3 is a cross sectional view across the span direction of a leading edge structure embodying the invention.

As shown in FIG. 3, the plenum 17 is separated by a partition wall 49 into a leading edge plenum section 51 in the area of the leading edge point 23, and a downstream plenum section 53 downstream from the leading edge plenum section 51. The partition wall 49 extends in parallel to the span direction 19 and is formed as a membrane of fiber reinforced plastic. Both plenum sections 51, 53 are sealed from one another, so that the pressure in the leading edge plenum section 51 does not affect the pressure in the downstream plenum section 53.

The leading edge plenum section 51 is connected to a first air inlet 55 via a first duct 57 for letting in air from the ambient flow 39 to the leading edge plenum section 51 in order to blow out air through the corresponding micro pores 45 in connection with the leading edge plenum section 51. Further, the downstream plenum section 53 is connected to a second air inlet 59 via a second duct 61 for letting in air from the ambient flow 39 to the downstream plenum section 53 in order to blow out air through the corresponding micro pores 45 in connection with the downstream plenum section 53. The first air inlet 55 is separate from the second air inlet 59 and the first duct 57 is separate from the second duct 61. The first air inlet 55 and the first duct 57 as well as the second air inlet 59 and second duct 61 are configured for letting in such a mass flow rate during flight of the aircraft 1 that causes a 3% higher pressure in the leading edge plenum section 51 as in the downstream plenum section 53. The first air inlet 55 and the second air inlet 59 are formed as combined air inlet/outlet devices 63 configured for both letting in air from the ambient flow 39 and blowing out air into the ambient flow 39.

Figure 2:
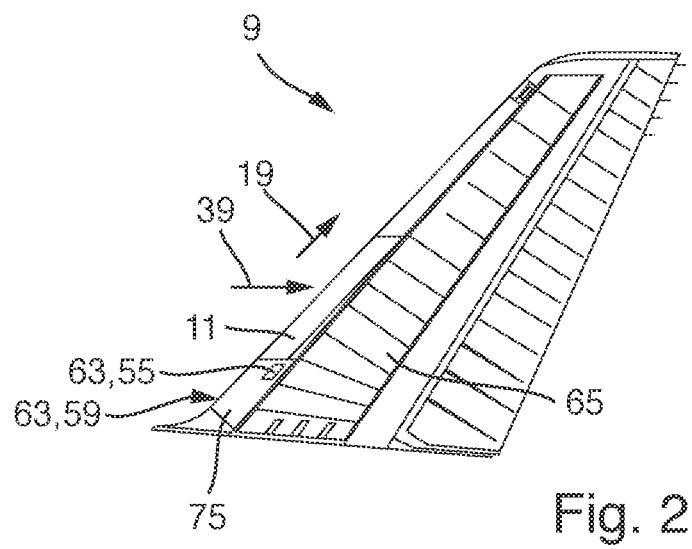
FIG. 2 is a side view of a vertical tail plane embodying the invention.

As shown in FIGS. 2 and 3, the vertical tail plane 9 comprises a vertical tail plane box 65 and the leading edge structure 11 mounted to the vertical tail plane box 65. The vertical tail plane box 65 has a first lateral panel 67 with a first attachment portion 69 and an opposite second lateral panel 71 with a second attachment portion 73. The first attachment end 25 of the leading edge structure 11 is attached to the first attachment portion 69 and the second attachment end 29 is attached to the second attachment portion 73, so that the first side portion 21 of the leading edge panel 13 forms a continuous flow surface with the first lateral panel 67 of the vertical tail plane box 65 and the second side portion 27 of the leading edge panel 13 forms a continuous flow surface with the second lateral panel 71 of the vertical tail plane box 65. The first air inlet 55 and the second air inlet 59 are arranged on opposite sides in another leading edge panel 75 beside the leading edge structure 11 with respect to the span direction 19. The first and second ducts 57, 61 extend through the space between the vertical tail plane box 65 and the other leading edge panel 75.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge structure for a flow control system of an aircraft comprising:
   a leading edge panel covering a plenum in a curved manner, the plenum extending in a span direction of the leading edge structure,
   wherein the leading edge panel has a first side portion extending from a leading edge point to a first attachment end,
   wherein the leading edge panel has a second side portion, opposite the first side portion, extending from the leading edge point to a second attachment end,
   wherein the leading edge panel comprises an inner surface facing the plenum and an outer surface in contact with an ambient flow,
   wherein the leading edge panel comprises a plurality of micro pores forming a fluid connection between the plenum and the ambient flow,
   wherein the plenum is separated by a partition wall into a leading edge plenum section aligned with the leading edge point, and a downstream plenum section downstream from the leading edge plenum section,
   wherein the leading edge plenum section is connected to a first air inlet via a first duct, wherein the downstream plenum section is connected to a second air inlet via a second duct, wherein the first air inlet is separate from the second air inlet and the first duct is separate from the second duct, and
   wherein the plenum is configured to be at a pressure greater than a dynamic air pressure of the ambient air flow over the outer surface.

2. The leading edge structure according to claim 1, wherein the first air inlet and the first duct and/or the second air inlet and second duct are configured to receive a mass flow of air to cause a higher pressure in the leading edge plenum section as compared to the downstream plenum section.

3. The leading edge structure according to claim 1, wherein the first air inlet and/or the second air inlet is formed as a combined air inlet/outlet device.

4. The leading edge structure according to claim 1, further comprising a back wall connecting the first attachment end to the second attachment end of the leading edge panel, thereby enclosing the plenum on a side opposite the leading edge point.

5. The leading edge structure according to claim 1, wherein the leading edge panel has a double-walled form including an inner wall element having the inner surface and an outer wall element having the outer surface.

6. The leading edge structure according to claim 5, wherein between the inner and outer wall elements the leading edge panel comprises a plurality of elongate stiffeners spaced apart from one another, so that between each pair of adjacent stiffeners a hollow chamber is formed between the inner and outer wall elements.

7. The leading edge structure according to claim 6, wherein the outer wall element comprises the plurality of micro pores forming a fluid connection between the hollow chambers and the ambient flow, and wherein the inner wall element comprises openings forming a fluid connection between the hollow chambers and the plenum.

8. A vertical tail plane for an aircraft comprising
a vertical tail plane box having a first lateral panel with a first attachment portion and an opposite second lateral panel with a second attachment portion,
a leading edge structure according to claim 1,
wherein the first attachment end is attached to the first attachment portion, and wherein the second attachment end is attached to the second attachment portion, so that the first side portion of the leading edge panel forms a continuous flow surface with the first lateral panel of the vertical tail plane box, and the second side portion of the leading edge panel forms a continuous flow surface with the second lateral panel of the vertical tail plane box.

9. The vertical tail plane according to claim 8, wherein the first is arranged in the first lateral panel and the second air inlet is arranged in the second lateral panel.

10. A leading edge structure for a lifting or air control structure on an aircraft, the leading edge structure comprising:
a leading edge panel including a leading edge point region and first and second side portions opposite to each other, and the first and second side portions each extend in a chord-wise direction from the leading edge point region, wherein the leading edge panel includes an outer surface configured to be exposed to an ambient air flow while the aircraft is in flight and an inner surface opposite to the outer surface;
a plenum within the leading edge panel and facing the inner surface, wherein the plenum extends in a span-wise direction through the leading edge structure;
micro pores in the leading edge panel and extending between the outer and inner surfaces, wherein the micro pores form a fluid connection between the plenum and the ambient flow;
a partition wall separating a leading edge plenum section of the plenum and a downstream plenum section of the plenum, wherein the partition wall has a first edge region and a second edge region, opposite to the first edge region, wherein the first and second edge regions are attached to the inner surface of the leading edge panel, and the partition wall is impervious such that air in the leading edge plenum section does not leak into downstream plenum section;
a first air inlet connected to the leading edge plenum via a first duct, and
a second air inlet connected to the downstream plenum via a second duct, wherein the first air inlet is separate from the second air inlet and the first duct is separate from the second duct;
wherein the leading edge plenum section is aligned with and adjacent the leading edge point region and the downstream plenum section is aligned with and adjacent at least one of the first and second side portions, and
wherein the plenum is configured to be at a pressure greater than a dynamic air pressure of the ambient air flow over the outer surface.

11. The leading edge structure of claim 10, wherein the lifting or air control structure is a vertical tail plane.

12. The leading edge structure of claim 10, wherein the leading edge plenum section is configured to be operated at a higher internal air pressure than the downstream plenum section.

13. The leading edge structure of claim 10, further comprising:
a first ambient air inlet and a first duct extending between the first ambient air inlet and the leading edge plenum section such that ambient air entering the first ambient air inlet passes through the first duct and pressurizes the leading edge plenum section, and
a second ambient air inlet and a second duct extending between the second ambient air inlet and the downstream plenum section such that ambient air entering the second ambient air inlet passes through the second duct and pressurizes the downstream plenum section to a pressure level lower than a pressure in the leading edge plenum section.

14. A method of pressurizing a plenum in a leading edge structure of a lifting or air control structure on an aircraft, wherein the leading edge structure includes:
a leading edge panel including a leading edge point region and first and second side portions opposite to each other, and the first and second side portions each extend in a chord-wise direction from the leading edge point region; wherein the leading edge panel includes an outer surface configured to be exposed to an ambient air flow while the aircraft is in flight and an inner surface opposite to the outer surface;
a plenum within the leading edge panel and facing the inner surface, wherein the plenum extends in a span-wise direction through the leading edge structure,
micro pores in the leading edge panel and extending between the outer and inner surfaces, wherein the micro pores form a fluid connection between the plenum and the ambient flow, and
a partition wall separating a leading edge plenum section of the plenum, and a downstream plenum section of the plenum, wherein the partition wall has a first edge region and a second edge region, opposite to the first edge region, wherein the first and second edge regions are attached to inner surface of the leading edge panel, and the partition wall is impervious such that air in the leading edge plenum section does not leak into downstream plenum section,
wherein the leading edge plenum section is aligned with and adjacent the leading edge point region and the downstream plenum section is aligned with and adjacent at least one of the first and second side portions, and
the method comprises:
moving the leading edge structure through ambient air during fight of the aircraft;
pressurizing the leading edge plenum section to a first pressure level which is greater than a dynamic air pressure of the ambient air flowing over the outer surface at the leading edge point region; and
pressurizing the downstream plenum section to a second pressure level which is greater than a dynamic pressure of the ambient air flowing over the outer surface at the first and/or second side portions, wherein the second pressure level is less than the first pressure level.

15. The method of claim 14, further comprising:
the pressurization of the leading edge plenum section is performed by ducting ambient air into a first ambient air inlet on the aircraft and into a first duct extending between the first ambient air inlet and the leading edge plenum section, and the pressurization of the downstream plenum section is performed by ducting ambient air into a second ambient air inlet on the aircraft and into a second duct extending between the second ambient air inlet and the downstream plenum section such that ambient air entering the second ambient air inlet passes through the second duct and pressurizes the downstream plenum section.

16. The leading edge structure of claim 1, wherein the leading edge plenum section is sealed from the downstream plenum section such that pressure in the leading edge plenum section does not affect the pressure in the downstream plenum section.

17. The leading edge structure of claim 10, wherein the leading edge plenum section is sealed from the downstream plenum section such that pressure in the leading edge plenum section does not affect the pressure in the downstream plenum section.

18. The method of claim 14, wherein the leading edge plenum section is sealed from the downstream plenum section such that pressure in the leading edge plenum section does not affect the pressure in the downstream plenum section.

* * * * *